(12) United States Patent
Jia

(10) Patent No.: US 11,028,897 B2
(45) Date of Patent: Jun. 8, 2021

(54) TORSIONAL VIBRATION DAMPER AND METHOD OF MAKING SAME

(71) Applicant: Litens Automotive Partnership, Woodbridge (CA)

(72) Inventor: Zhengjie Jia, Woodbridge (CA)

(73) Assignee: LITENS AUTOMOTIVE PARTNERSHIP, Woodbridge (CA)

( * ) Notice: Subject to any disclaimer, the term of this patent is extended or adjusted under 35 U.S.C. 154(b) by 239 days.

(21) Appl. No.: 16/249,895

(22) Filed: Jan. 16, 2019

(65) Prior Publication Data

US 2019/0219130 A1    Jul. 18, 2019

Related U.S. Application Data

(60) Provisional application No. 62/617,649, filed on Jan. 16, 2018, provisional application No. 62/632,576, (Continued)

(51) Int. Cl.
*F16F 15/14* (2006.01)
*F16F 7/104* (2006.01)
*F16F 9/54* (2006.01)

(52) U.S. Cl.
CPC .......... *F16F 15/1442* (2013.01); *F16F 7/104* (2013.01); *F16F 9/54* (2013.01); (Continued)

(58) Field of Classification Search
CPC .. F16F 7/10; F16F 7/104; F16F 7/1005; F16F 9/54; F16F 15/02; F16F 15/1428; (Continued)

(56) References Cited

U.S. PATENT DOCUMENTS

| | | | |
|---|---|---|---|
| 4,337,629 A | 7/1982 | Walter | |
| 4,860,611 A * | 8/1989 | Flanagan | F16C 15/00 74/572.12 |
| 6,238,294 B1 | 5/2001 | Martinek | |
| 8,091,450 B2 | 1/2012 | Manzoor et al. | |
| 8,117,943 B2 | 2/2012 | Manzoor | |

(Continued)

FOREIGN PATENT DOCUMENTS

| | | |
|---|---|---|
| DE | 7321086 U | 12/1974 |
| DE | 19839470 A1 | 3/1999 |

(Continued)

*Primary Examiner* — Robert A. Siconolfi
*Assistant Examiner* — San M Aung
(74) *Attorney, Agent, or Firm* — Millman IP Inc.

(57) ABSTRACT

In an aspect, a torsional vibration damper is provided, comprising a hub portion that mounts to a crankshaft, an outer ring that includes an inertial mass, a plurality of radial connectors that are elastically deformable and a plurality of spacers that extend circumferentially between the radial connectors and which are elastically deformable by the radial connectors during flexure thereof. The spacers are non-metallic and dissipate energy from deformation via conversion to heat. The plurality of radial connectors have a circumferential spring rate K1$a$ in bending in a circumferential direction about the axis, and have an axial spring rate K1$b$ in bending in an axial direction, wherein K1$b$ is at least 10 times as large as K1$a$. The plurality of spacers have a circumferential spring rate Kra in the circumferential direction, and an axial spring rate Krb in bending in the axial direction, wherein Kra is less than 1% of K1$a$.

12 Claims, 11 Drawing Sheets

Related U.S. Application Data filed on Feb. 20, 2018, provisional application No. 62/656,709, filed on Apr. 12, 2018.

(52) U.S. Cl.
CPC ...... *F16F 15/1428* (2013.01); *F16F 2232/02* (2013.01); *F16F 2236/08* (2013.01); *F16F 2238/022* (2013.01); *F16F 2238/024* (2013.01)

(58) Field of Classification Search
CPC ............... F16F 15/1442; F16F 15/1203; F16F 2232/02; F16F 2236/02; F16F 2238/022; F16F 2238/024; F16F 2222/08; F16F 2224/024; F16F 2224/025; F16F 2224/0208; F16F 2226/04; F16F 2230/0005; F16F 2234/02; F16F 15/1202; F16F 15/121; F16F 15/124; F16F 15/131; F16F 2236/08; F16L 3/202; G03F 7/709; B21D 26/021; F16D 3/50
USPC ......................................................... 188/378
See application file for complete search history.

(56) References Cited

U.S. PATENT DOCUMENTS

| | | |
|---|---|---|
| 8,418,822 B2 | 4/2013 | Geislinger et al. |
| 9,046,135 B2 | 6/2015 | Geislinger et al. |
| 2001/0010109 A1 | 8/2001 | Jager |
| 2003/0078084 A1* | 4/2003 | Geislinger .......... F16F 15/1215 460/100 |
| 2005/0204858 A1 | 9/2005 | Crist |
| 2010/0171248 A1* | 7/2010 | Geislinger .............. F16F 15/16 267/140.13 |
| 2014/0066215 A1* | 3/2014 | Geislinger .......... F16F 15/1215 464/100 |
| 2015/0122605 A1* | 5/2015 | Grossgebauer .......... F16F 7/116 192/3.21 |
| 2017/0051818 A1 | 2/2017 | Ebke |
| 2017/0059028 A1 | 3/2017 | Manzoor |

FOREIGN PATENT DOCUMENTS

| | | |
|---|---|---|
| DE | 102016207130 A1 | 11/2017 |
| JP | 3-149417 A | 6/1991 |
| JP | 2002115726 A | 4/2002 |

\* cited by examiner

US 11,028,897 B2

TORSIONAL VIBRATION DAMPER AND METHOD OF MAKING SAME

FIELD

The specification relates generally to torsional vibration dampers. In particular, the following relates to torsional vibration dampers which provide elastomeric members with reduced shear thereon.

BACKGROUND OF THE DISCLOSURE

TVDs are well known devices used to control torsional vibrations in a crankshaft of an engine. However they suffer from design problems and operational problems due at least in part on the fact that the rubber layer that they contain is called upon to provide many functions at once, which can result in performance by the TVD that is compromised in one way or another. Improved TVDs are desired.

SUMMARY OF THE DISCLOSURE

In one aspect, there is provided a torsional vibration damper, comprising: a hub portion that is mountable to a crankshaft of an engine and which defines an axis, wherein the hub portion is devoid of springs; an outer ring that includes an inertial mass and which is devoid of springs; a plurality of radial connectors that extend between the outer ring and the hub portion and connect the outer ring and the hub portion, wherein the radial connectors are elastically deformable to permit relative circumferential movement about the axis between the outer ring and the hub portion and which urge the outer ring and the hub portion back towards a neutral position thereduring, wherein the radial connectors extend directly between the hub portion and the outer ring; and a plurality of spacers that extend circumferentially between the radial connectors and which are elastically deformable by the radial connectors during flexure thereof, during said relative circumferential movement about the axis between the outer ring and the hub portion and which urge the outer ring and the hub portion towards the neutral position during said relative circumferential movement, wherein the spacers are non-metallic and dissipate energy from deformation via conversion to heat, wherein the plurality of radial connectors have a circumferential spring rate $K1a$ in bending in a circumferential direction about the axis, and have an axial spring rate $K1b$ in bending in an axial direction, wherein $K1b$ is at least 10 times as large as $K1a$, wherein the plurality of spacers have a circumferential spring rate $Kra$ in the circumferential direction, and an axial spring rate $Krb$ in bending in the axial direction, wherein $Kra$ is less than 1% of $K1a$.

In another aspect, there is provided a torsional vibration damper, comprising: a hub portion that is mountable to a crankshaft of an engine and which defines an axis, wherein the hub portion is devoid of springs; an outer ring that includes an inertial mass and which is devoid of springs; a plurality of radial connectors that extend between the outer ring and the hub portion and connect the outer ring and the hub portion, wherein the radial connectors are elastically deformable to permit relative circumferential movement about the axis between the outer ring and the hub portion and which urge the outer ring and the hub portion back towards a neutral position thereduring, wherein the radial connectors extend directly between the hub portion and the outer ring and are metallic; and a plurality of spacers that extend circumferentially between the radial connectors and which are elastically deformable by the radial connectors during flexure thereof, during said relative circumferential movement about the axis between the outer ring and the hub portion and which urge the outer ring and the hub portion towards the neutral position during said relative circumferential movement, wherein the spacers are non metallic and dissipate energy from deformation via conversion to heat, wherein the plurality of spacers have a circumferential spring rate $Kra$ in relation to flexure in a circumferential direction, and an axial spring rate in bending in the axial direction, wherein $Kra$ is less than 1% of $K1a$, wherein:
 m=a mass of the inertial mass,
 t1=a thickness in a circumferential direction of each of the plurality of radial connectors,
 w3=a thickness in an axial direction of each of the plurality of radial connectors,
 N1=a number of radial connectors making up the plurality of radial connectors,
 D3=a diameter from the axis to a second end of a free portion of the plurality of radial connectors, and
 D4=a diameter from the axis to a first end of the free portion of the plurality of radial connectors,
 wherein m, t1, w3, N1, D3 and D4 are selected such that a lowest natural frequency for the torsional vibration damper is for bending in the circumferential direction about the axis.

BRIEF DESCRIPTIONS OF THE DRAWINGS

For a better understanding of the various embodiments described herein and to show more clearly how they may be carried into effect, reference will now be made, by way of example only, to the accompanying drawings in which.

DETAILED DESCRIPTION

Figure 1A:
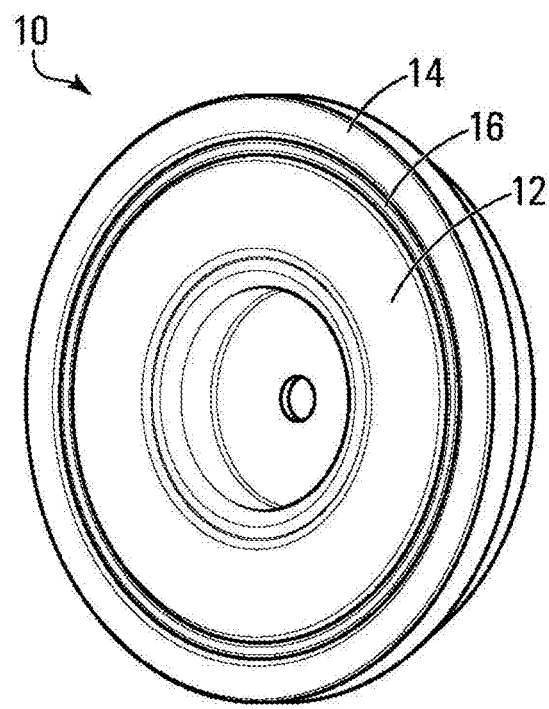
FIG. 1A shows a perspective view of a TVD of the prior art.

For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Figure 1B:
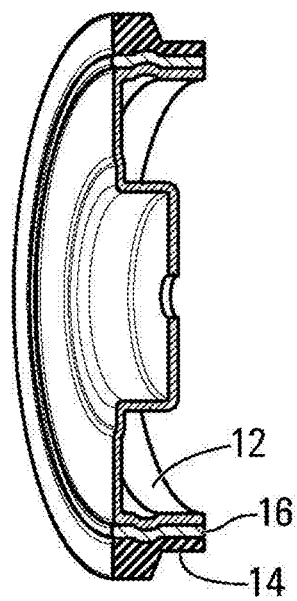
FIG. 1B shows a perspective sectional view of the TVD shown in FIG. 1A.

Reference is made to FIGS. 1A and 1B, which show a torsional vibration damper (TVD) 10 in accordance with the prior art. As is well known in the art, an internal combustion engine operates by combustion of a fuel sequentially in several cylinders of the engine, which drives linear movement of pistons, which in turn causes rotation of a crankshaft that is connected to the pistons via connecting rods. However, the forces applied to the crankshaft are inherently non-uniform due to the sequential combustion events that occur in the cylinders. As a result of the non-uniform forces, torsional vibrations arise in the crankshaft. As is also well known, the crankshaft has a natural frequency at which torsional vibrations can result in resonance, wherein the vibrations become progressively amplified causing increased stress in the crankshaft and eventual failure of the crankshaft. The TVD 10 is mounted to and rotates with the crankshaft (not shown) of an engine to absorb and dissipate torsional vibrations that arise in the crankshaft due to the non-uniform forces that are applied to the crankshaft by the pistons includes a plate 12 that is configured to mount to a crankshaft (not shown), an inertial mass 14, and a rubber layer 16 between the plate 12 and the inertial mass 14. The rubber layer 16 is provided to permit the inertial mass 14 to resiliently move circumferentially relative to the crankshaft, but with a phase shift of 180 degrees relative to the torsional vibrations experienced by the crankshaft. As a result, the vibrations incurred by the inertial mass of the TVD cancel out the vibrations that occur in the crankshaft. By designing the TVD 10 to have a natural frequency that is similar to that of the crankshaft it is at least theoretically possible to neutralize the torsional vibrations even at the natural frequency of the crankshaft, which is particularly important.

In addition to canceling out vibrations in the crankshaft through a phase-shifted vibration in the inertial mass, the TVD 10 also provides a damping function so as to dissipate some of the energy of the vibrations in the crankshaft. This further helps to quell any increase in amplitude of the torsional vibrations that occur at the natural frequency. This damping function occurs naturally by the deformation and restoration of the rubber layer 16.

Several problems exist with TVD's such as the TVD 10. One problem relates to the ability of the rubber layer 16 to dissipate the heat that is generated as it undergoes repeated deformation and restoration. The rubber layer 16 in a typical TVD as shown, is relatively thin, usually in the range of a few millimetres thick. As a result, it can be seen, that there is relatively little surface area of the rubber layer 16 that is exposed to the air for heat dissipation. As a result of this small surface area, there can be significant heat buildup in the rubber layer 16 during operation of the TVD 10. This is problematic for many rubbers since their temperature can affect their stiffness. The stiffness of the rubber layer 16 is related to the natural frequency of the TVD 10, however. Thus, it will be understood that the temperature of the TVD 10 will impact on its natural frequency, which makes it difficult to design the TVD 10 to have a natural frequency that is similar to the natural frequency of the crankshaft, since the temperature of the TVD 10 when the crankshaft is turning at its natural frequency cannot be predicted with any certainty.

Another problem is that repeated temperature excursions by the rubber layer 16 can result in the aging of the rubber layer 16, whereby it becomes progressively more brittle over time. This increase in brittleness results in a gradual change in the natural frequency of the TVD 10 away from the natural frequency that it started with, which can make it progressively less able to cancel out torsional vibration in the crankshaft 12 at the natural frequency.

Yet another problem with the TVD 10 is that the repeated relative movement of the inertial mass relative to the plate applies high shear forces and therefore high shear stresses to the rubber in the rubber layer 16. This can lead to eventual damage to the rubber layer 16, and will also result in change the natural frequency of the TVD 10 progressively.

Figure 2A:
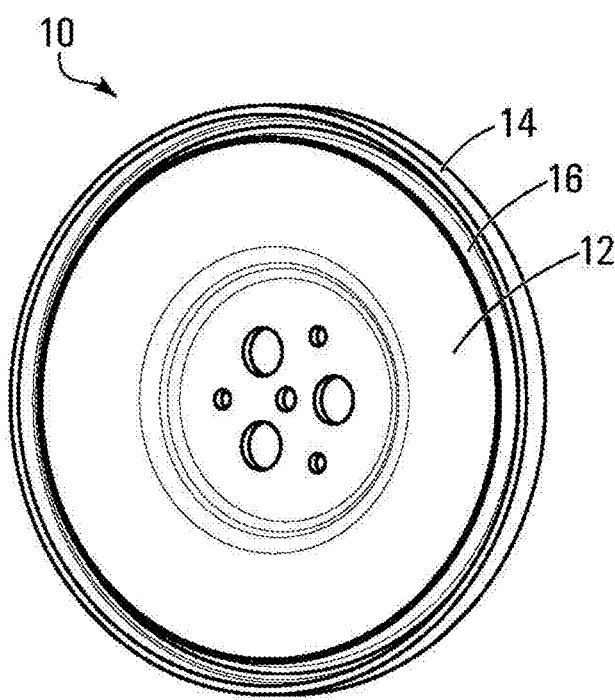
FIG. 2A shows a perspective view of another TVD of the prior art.
Figure 2B:
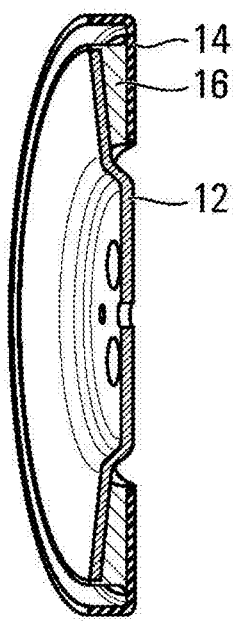
FIG. 2B shows a perspective sectional view of the TVD shown in FIG. 2A.

FIGS. 2A and 2B show a variant of the TVD 10, in which the rubber layer 16 is not positioned radially between the plate and the inertial mass—it is positioned axially between the two. However, the same problems arise regardless, due to the difficulty in dissipating heat from the rubber, due to the aging of the rubber over time, and due to the shear forces on the rubber.

Figure 3:
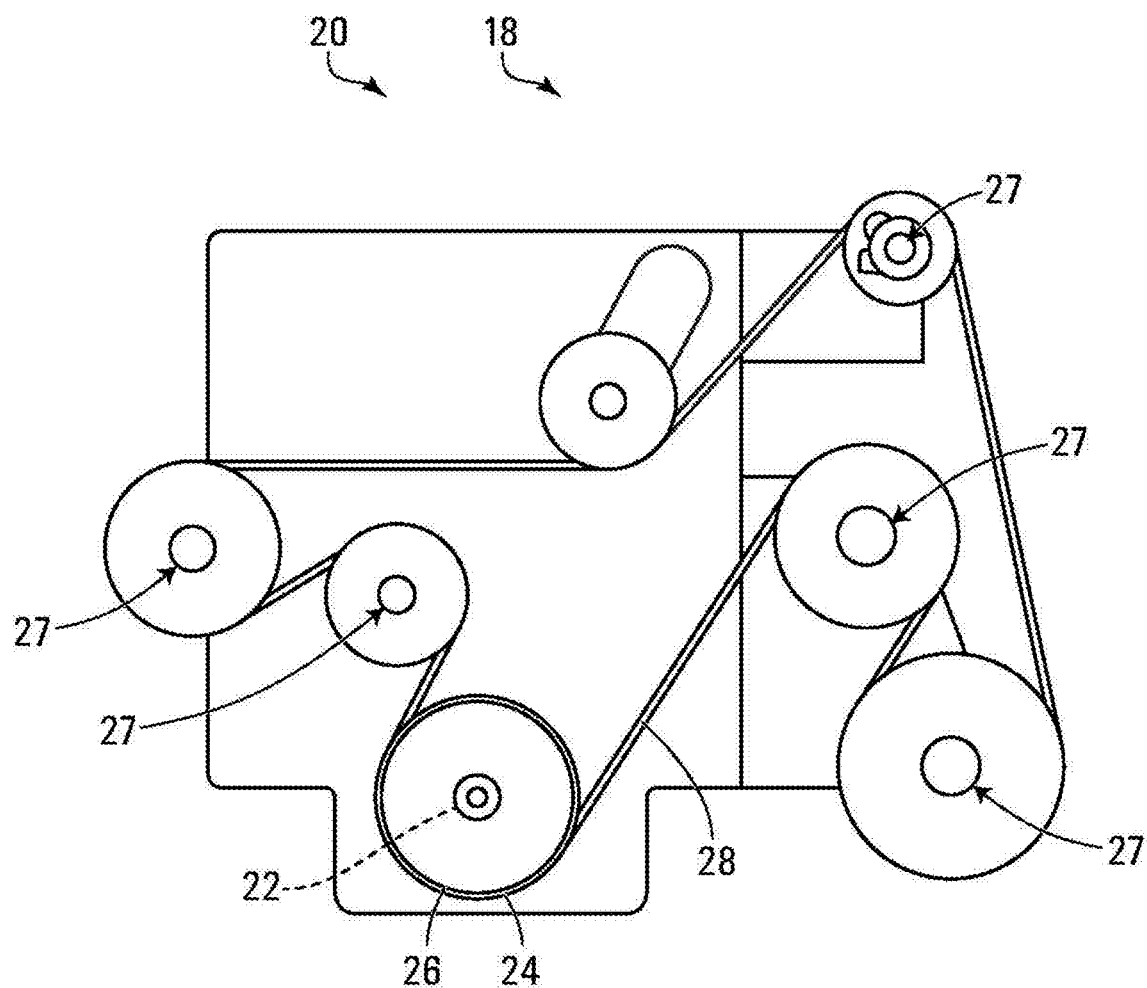
FIG. 3 is an elevation view of an endless drive arrangement on an engine with a TVD according to an embodiment of the present disclosure.
Figure 4B:
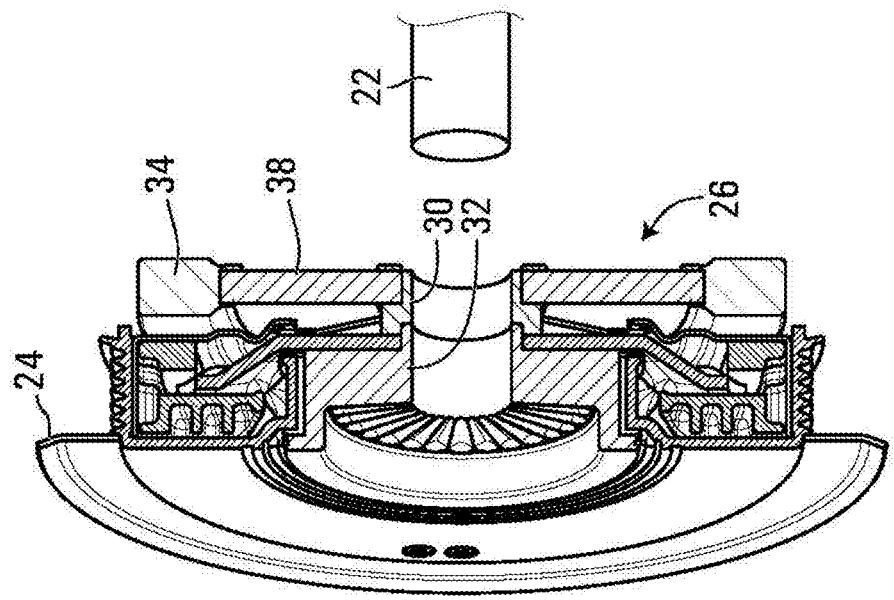
FIG. 4B is a perspective sectional view of the TVD shown in FIG. 4A with a crankshaft pulley.
Figure 4A:
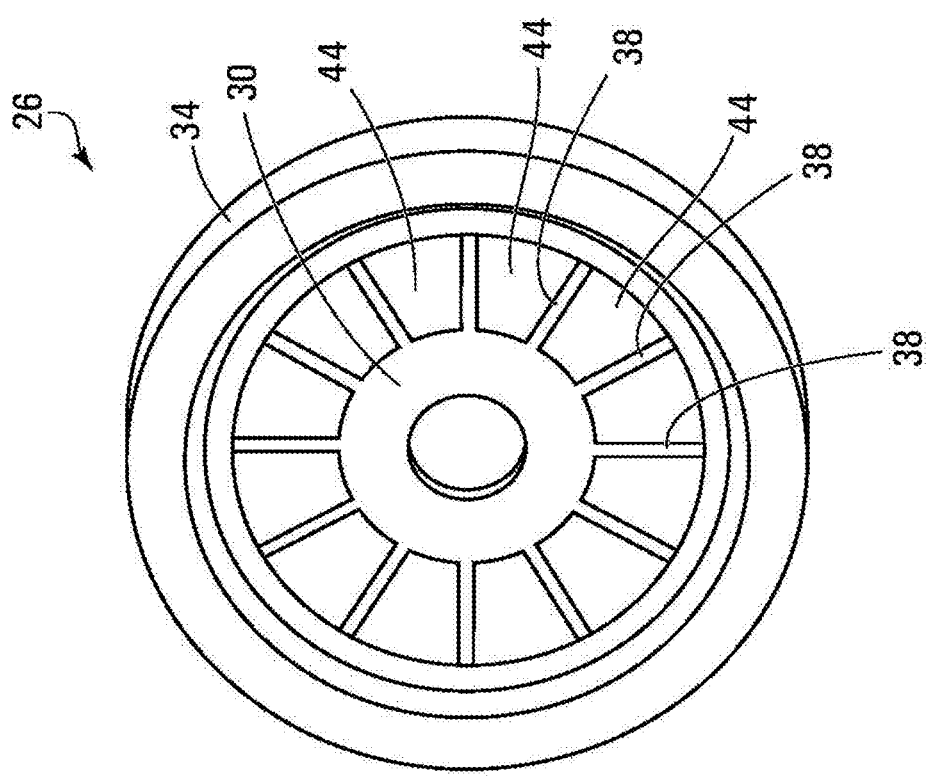
FIG. 4A is a perspective view of the TVD shown in FIG. 3.
Figure 5:
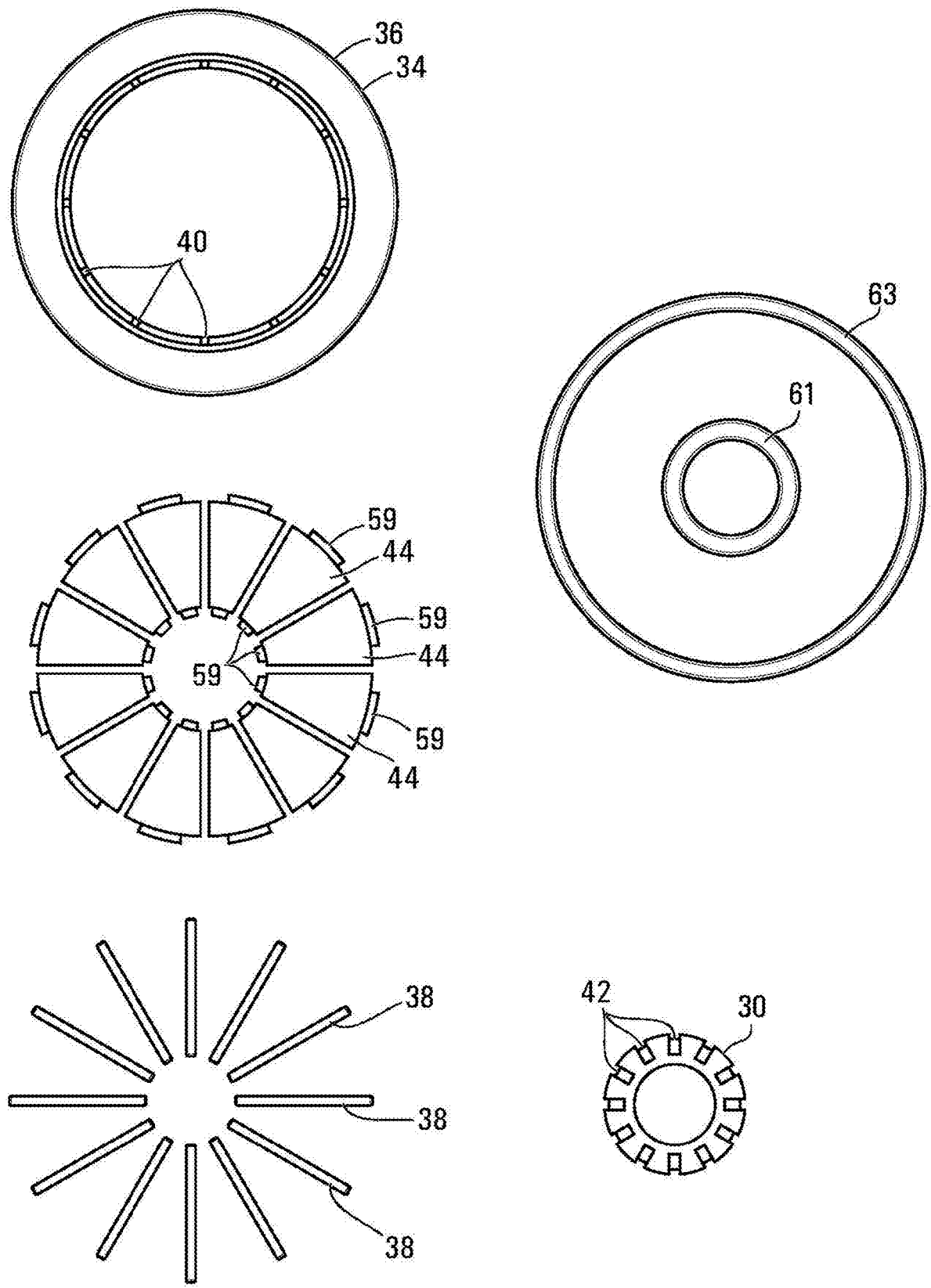
FIG. 5 is an exploded view of the TVD shown in FIG. 4A.

Reference is made to FIG. 3, which shows an endless drive arrangement 18 for an engine 20. The engine includes a crankshaft 22 that has a crankshaft pulley 24 thereon, and a TVD 26 in accordance with an embodiment of the present disclosure thereon. The crankshaft pulley 24 is connected to various accessories 27 via a belt 28.

The TVD 26 is shown in more detail in FIGS. 4A, 4B, 5 and 6. The TVD 26 includes a hub portion 30 that is mountable to the crankshaft 22. In the present example, the TVD 26 is mountable both to a sleeve portion 32 (FIG. 4B) of the crankshaft pulley 24, and to the crankshaft 22. In the present example, the crankshaft pulley 24 may be an isolator pulley 20 which incorporates springs (not shown) to protect the belt 28 and the accessories driven thereby from torsional vibrations that are present in the crankshaft 22. Alternatively, any other suitable type of crankshaft pulley 24 could be provided, such as, for example, a standard pulley that does not incorporate isolation springs.

The hub portion 30 defines an axis A which is coaxial with the axis of the crankshaft 22 itself. The hub portion 30 is devoid of springs. The hub portion 30 may be made from any suitable material, such as, for example, low carbon steel.

The TVD 26 further includes an outer ring 34 that includes an inertial mass 36 and is also devoid of springs 36. The inertial mass 36 may be made from any suitable material, such as, for example, cast iron.

The TVD 26 further includes a plurality of radial connectors 38 that extend between the outer ring 34 and the hub portion 30 and connect the outer ring 34 and the hub portion 30. In the present example, the outer ring 34 includes a plurality of outer ring slots 40 and the hub portion 30 includes a plurality of hub portion slots 42, and the radial connectors 38 extend into the outer ring slots 40 and into the hub portion slots 42. The radial connectors 38 can be fixedly mounted in the outer ring slots 40 and the hub portions 42 in any suitable way. For example, the slots 40 and 42 may be sized to be a bit smaller than the radial connectors 38. Due to thermal expansion, however, the radial connectors 38 can be inserted into the slots 40 and 42 when the outer ring 34 and the hub portion 30 are heated sufficiently. Once the outer ring 34 and the hub portion 30 cool back down, the slots 40 and 42 shrink to form an interference fit with the radial connectors 38 and therefore a very strong bond therewith.

Figure 7B:
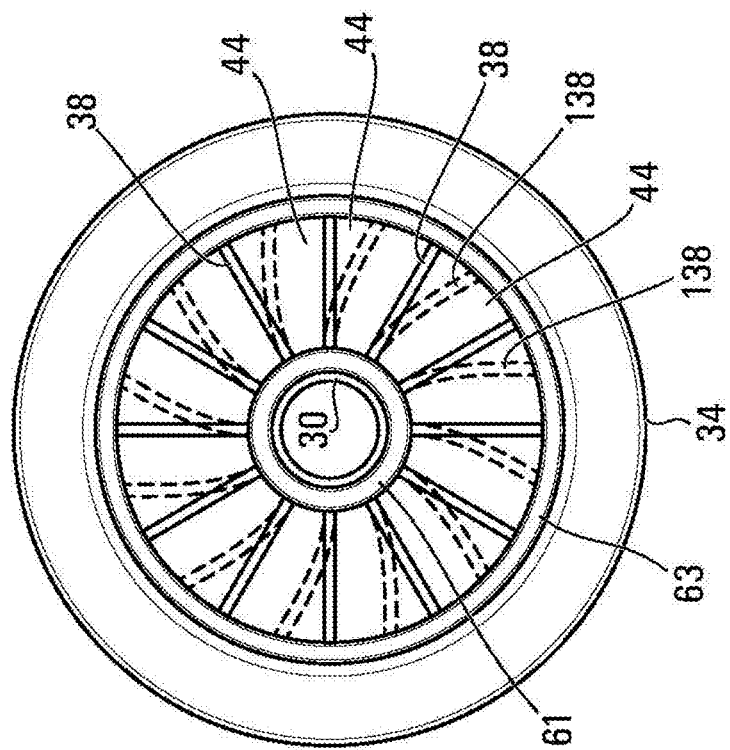
FIG. 7B is an elevation view of the TVD shown in FIG. 4A when undergoing torsion.
Figure 7A:
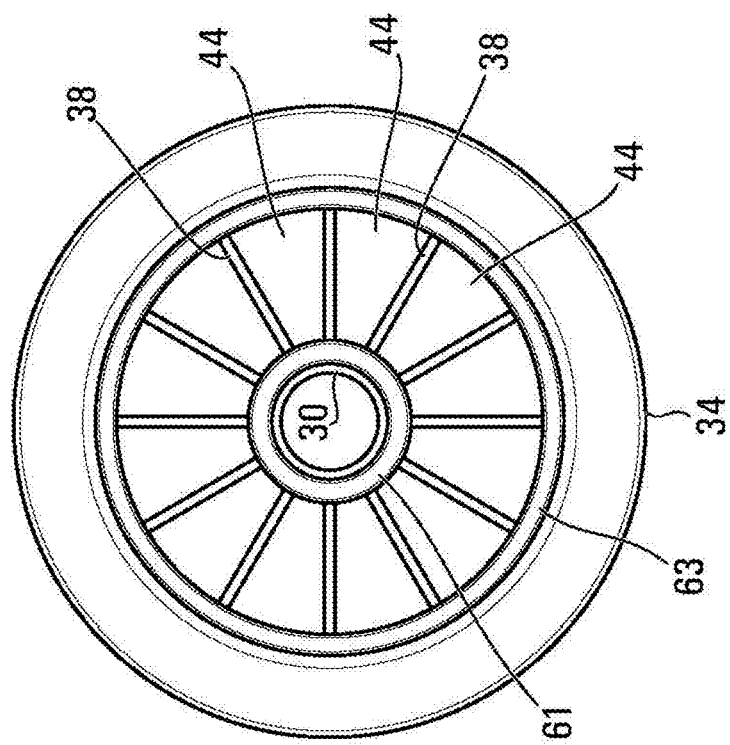
FIG. 7A is an elevation view of the TVD shown in FIG. 4A in a neutral position.

The radial connectors 38 are elastically deformable to permit relative circumferential movement about the axis between the outer ring 34 and the hub portion 30 and which urge the outer ring 34 and the hub portion 30 back towards a neutral position thereduring. FIG. 7A shows the neutral position for the TVD 26. FIG. 7B shows the TVD 26 during some amount of bending of the radial connectors 38 in the circumferential direction about the axis A (during which they urge the outer ring 34 and the 30 back towards the neutral position shown in FIG. 7A.

In the example shown, when the TVD 26 is in the neutral position as shown in FIG. 7A, the radial connectors 38 extend directly radially between the outer ring 34 and the hub portion 30. However, this does not have to be the case. In an alternative embodiment, the radial connectors 38 could extend in a path that is not directly radial when in the neutral position.

However, it will be noted that the radial connectors 38 extend directly between the hub portion 30 and the outer ring 34, in the sense that the radial connectors 38 do not extend, for example, between the hub portion 30 to some intermediate member that is itself connected via a spring or the like to the outer ring 34.

The radial connectors 38 may be made from any suitable material, such as, for example, spring steel.

The TVD 26 further includes a plurality of spacers 44 that extend circumferentially between the radial connectors 38, and which are elastically deformable by the radial connectors 38 during flexure thereof (e.g. as shown in FIG. 7B), during the relative circumferential movement about the axis A between the outer ring 34 and the hub portion 30. The spacers 44 also urge the outer ring 34 and the hub portion 30 towards the neutral position during said relative circumferential movement. The spacers 44 may be made from any suitable material, such as, for example, a non-metallic material, such as an elastomer, such as, a type of rubber. The spacers 44 also dissipate energy from deformation via conversion to heat. The spacers 44 may extend all the way radially from the hub portion 30 to the outer ring 34 although it is not necessary. In the example shown, the spacers do so, and have bosses 59 which fit in corresponding channels in the outer ring 34 and in the hub portion to inhibit the spacers 44 from coming out of position. Additionally, the spacers 44 are captured on one side between shoulders on the hub portion 30 and on the outer ring 34, and on the other side by locking rings 61 and 63 which mount to the hub portion 30 and the outer ring 34 respectively. The locking rings 61 and 63 may mount by any suitable means to the hub portion 30 and the outer ring 34 such as by fasteners (not shown).

Figure 6:
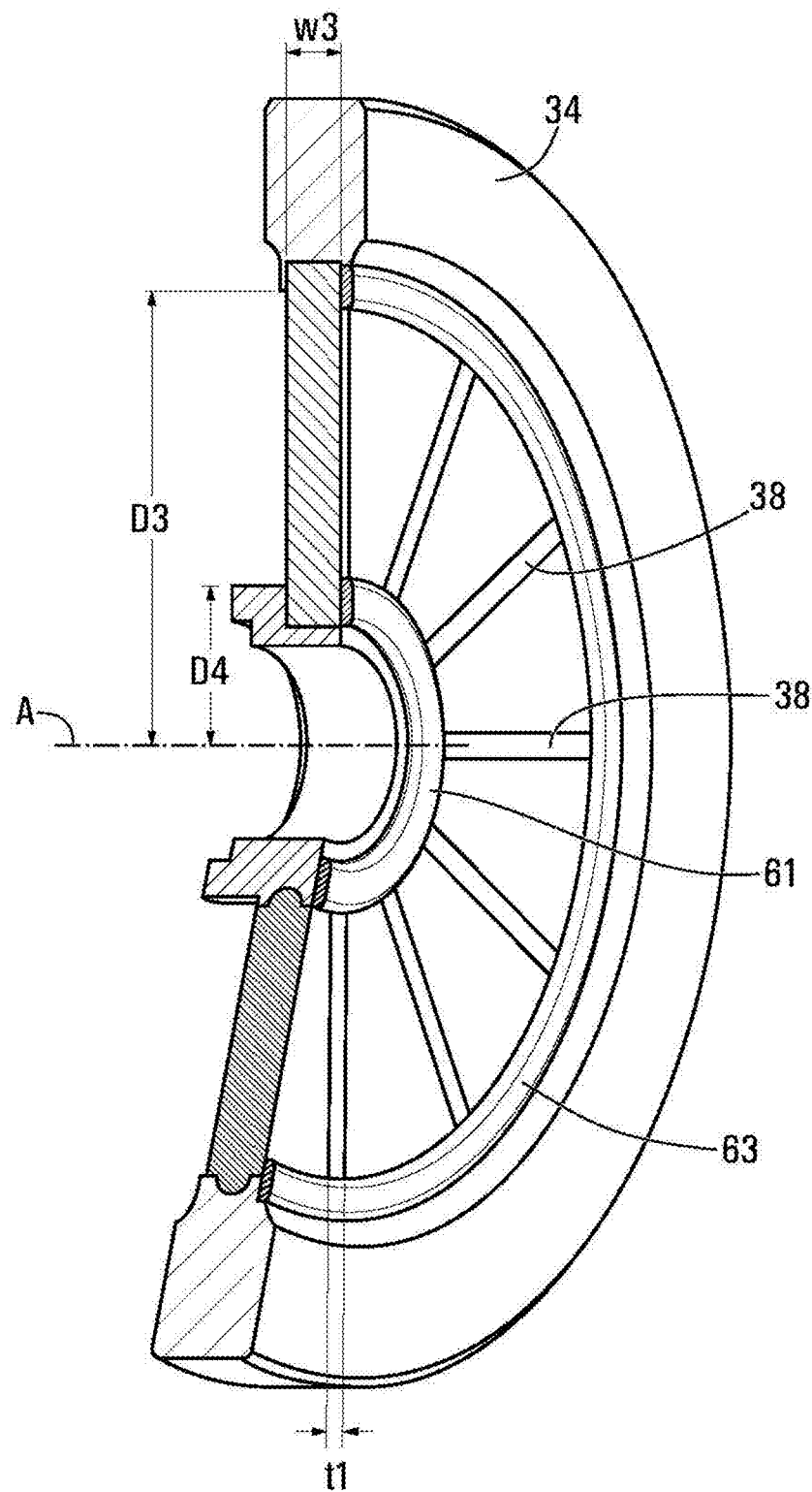
FIG. 6 is a sectional perspective view of the TVD shown in FIG. 4A.
Figure 8D:
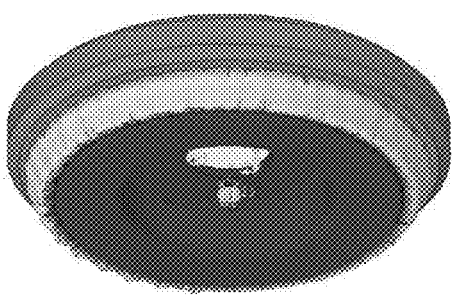
FIGS. 8A-8D are finite element representations for modes of the TVD shown in FIG. 1A.
Figure 8C:
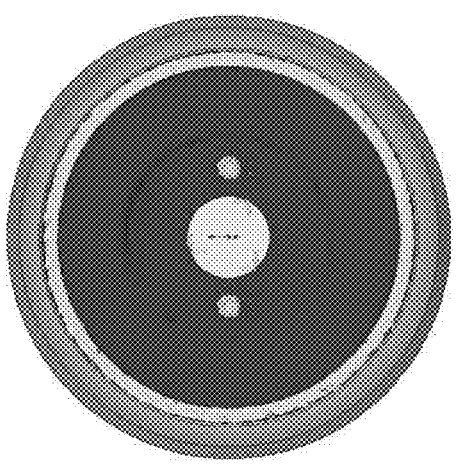
Figure 8B:
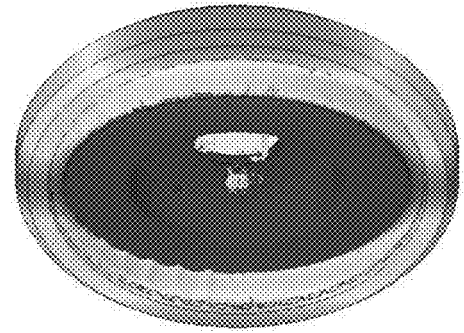
Figure 8A:
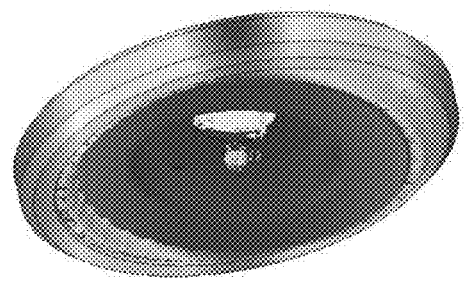
Figure 9D:
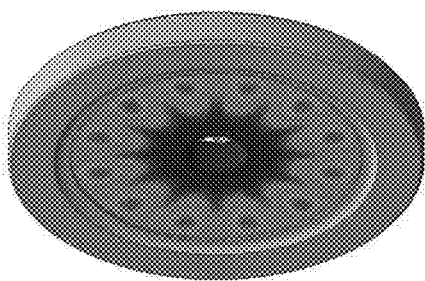
FIGS. 9A-9D are finite element representations for modes of the TVD shown in FIG. 4A.
Figure 9C:
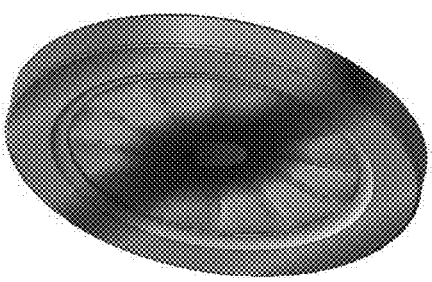
Figure 9B:
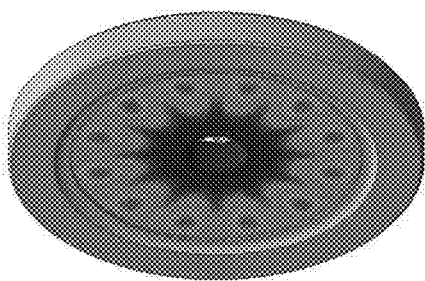
Figure 9A:
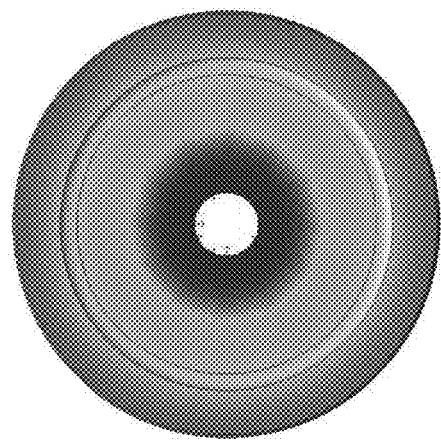

There are several properties of the TVD 26 which are described further below. These properties include:

m=a mass of the inertial mass 36 (m is not shown in the figures), t1=a thickness in a circumferential direction of each of the plurality of radial connectors, w3=a thickness in an axial direction of each of the plurality of radial connectors, N1=a number of radial connectors making up the plurality of radial connectors, D3=a diameter from the axis to a second end of a free portion of the plurality of radial connectors, and D4=a diameter from the axis to a first end of the free portion of the plurality of radial connectors.

t1, w3, N1, D3 and D4 are all shown in FIG. 6. The plurality of radial connectors 38 have a circumferential spring rate K1$a$ in bending in the circumferential direction about the axis (i.e. in relation to the deformation represented in FIG. 7B by the dashed lines shown at 138). This deformation may be referred to as torsion. The plurality of radial connectors 38 have an axial spring rate K1$b$ in bending in the axial direction. This is illustrated in the finite element representations shown in FIGS. 9B and 9C. For ease of understanding, FIGS. 8A and 8B are finite element representations illustrative of bending in the axial direction for the TVD 10 of the prior art. The axial spring rate K1$b$ is also the spring rate for pure relative movement in the axial direction. This movement is illustrated in FIG. 9D for the TVD 26, and FIG. 8D for the TVD 10 of the prior art.

Figure 11:
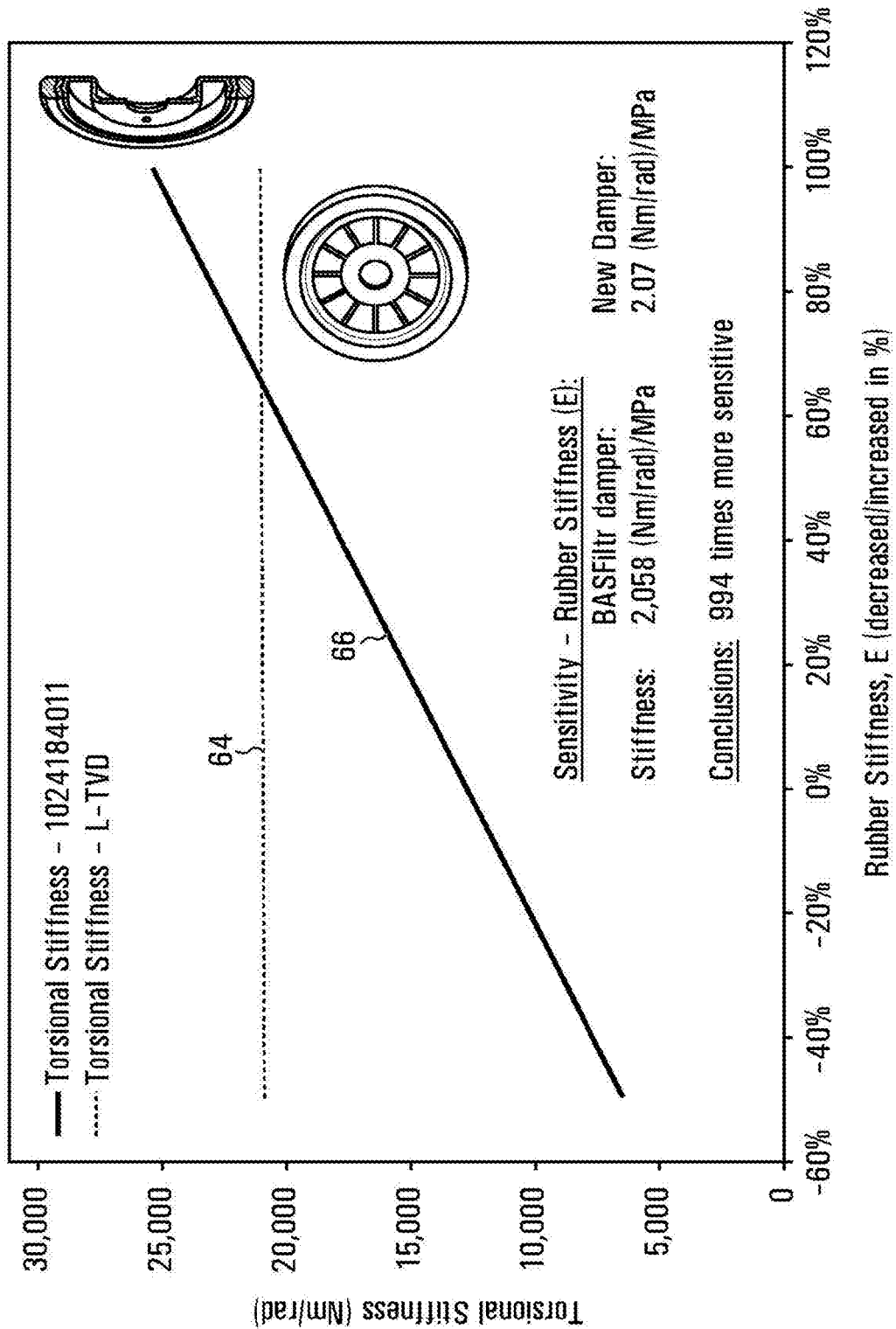
FIG. 11 is a graph illustrating rubber stiffness vs. spring rate.

The plurality of spacers 44 have a circumferential spring rate Kra in the circumferential direction, and an axial spring rate Krb in bending in the axial direction. The spacers 44 act in parallel with the radial connectors 38 in terms of resisting torsion. As a result, the effective spring rate of TVD 26 in torsion (referred to as the effective circumferential spring rate) is governed by the equation KC=K1$a$+Kra. Based on the properties of the radial connectors 38 and the spacers 44, Kra can be selected to be very small relative to K1$a$. In some embodiments, Kra may be less than 1% of K1$a$. It will be noted that the Young's modulus for the spacers 44 (in embodiments in which they are made from rubber) may be in the range of about 8 MPa. By comparison the Young's modulus for spring steel may be in the range of 200 GPa. As a result, it would be possible to select the values for K1$a$ and for Kra such that Kra is less than 0.1% of K1$a$, or even less. Based on this, it will be understood that the effective circumferential spring rate KC of the TVD 26 is essentially equal to the spring rate K1$a$, and is largely unaffected by the spring rate Kra. This is advantageous for several reasons. Firstly, since the effective circumferential spring rate KC is largely unaffected by the spring rate Kra, any aging, fatigue or temperature effects that might modify the spring rate Kra of the spacers 44 will have very little effect on the value of KC. FIG. 11 shows the relationship between the value of Kra and the value of KC for both the TVD 26 (curve 60) and the TVD 10 (curve 62). As can be seen, the spring rate Kra has essentially no effect on the value of KC for the TVD 26. By contrast, curve 62 shows that the spring rate of the rubber layer 16 has a very direct effect on the effective circumferential spring rate for the TVD 10. Additionally, another advantage to this feature of the TVD 26 is that the rubber used in the spacers 44 may be selected as desired to have good properties of heat dissipation, resistance to degradation and aging and any other desired properties, with little concern over how it will affect the effective circumferential spring rate of the TVD 26.

Figure 10:
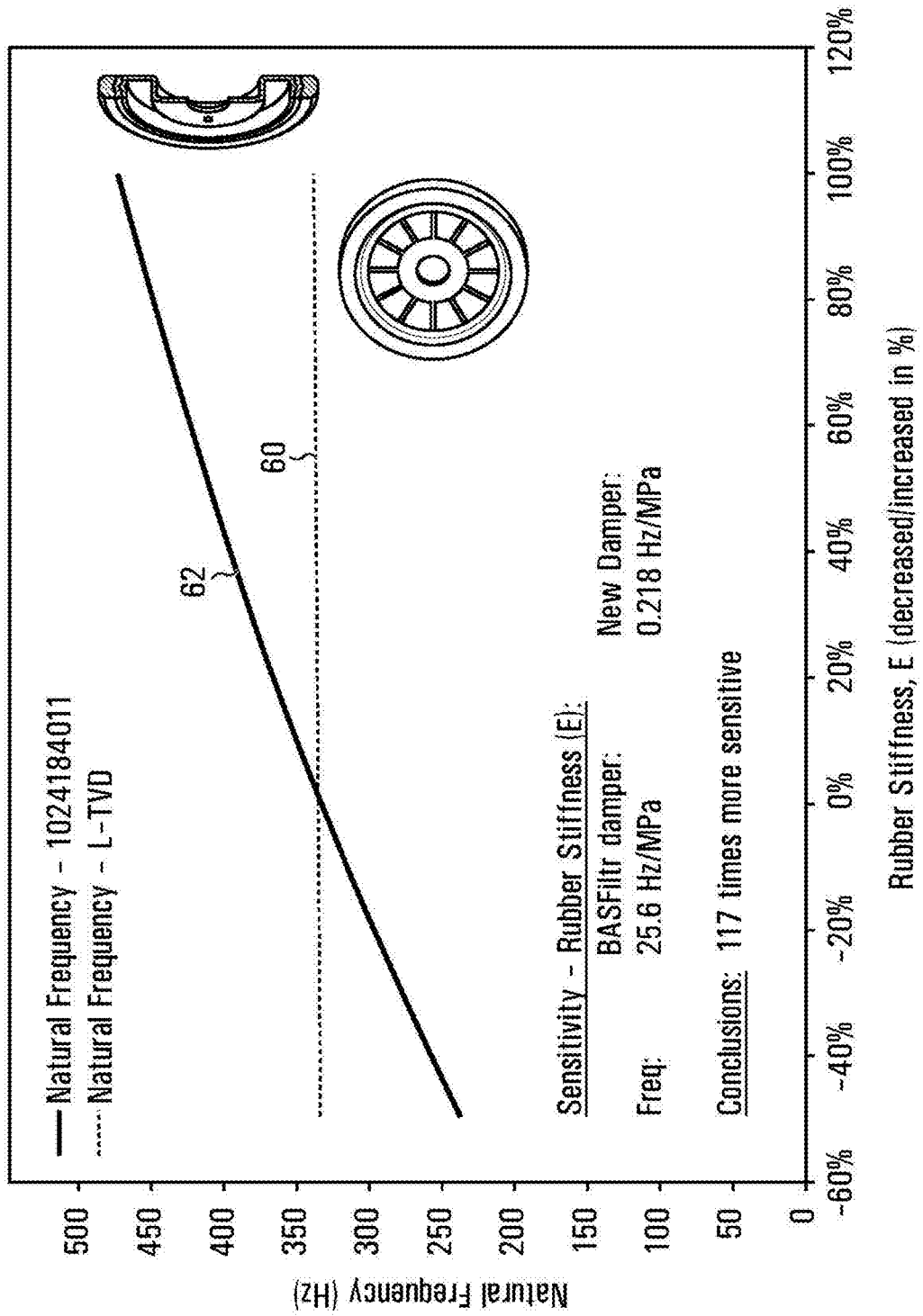
FIG. 10 is a graph illustrating rubber stiffness vs. natural frequency.

The effective circumferential spring rate KC of the TVD 26 is an important factor in the determination of the natural frequency for the TVD 26 in torsion. In general, a TVD is typically designed with a goal of having a natural frequency in torsion that is closely matched to a natural frequency in torsion for the crankshaft on which the TVD is to be mounted. It is therefore very advantageous for the TVD to have a natural frequency that remains substantially constant throughout its operating life. A problem with the TVD 10 is that its rubber layer 16 will have a spring rate that will vary with temperature, with fatigue, and with age, which will affect the natural frequency of the TVD 10. By contrast, the natural frequency of the TVD 26 will remain essentially constant regardless of whatever temperature effects, fatigue or aging effects are present in the spacers 44. FIG. 10 shows the effect of the spring rate Kra of the spacers 44 on the natural frequency in torsion for the TVD 26 (see curve 64), and shows the effect of the spring rate of the rubber layer on the natural frequency in torsion for the TVD 10 (see curve 66). As can be seen, the spring rate of the spacers 44 has essentially no effect on the natural frequency in torsion for the TVD 26, while the spring rate of the rubber layer 16 has a significant effect on the natural frequency in torsion for the TVD 10.

For the TVD 26, the axial spring rate K1$b$ is selected to be at least ten times as large as the spring rate K1$a$. This provides several advantages to the TVD 26. One advantage relates to the first mode for the TVD 26, also referred to as the lowest natural frequency. In general, a TVD will have a natural frequency in torsion, a natural frequency in bending in the axial direction, and a natural frequency in pure axial deformation. In general, a TVD is designed to have a natural frequency in torsion that closely matches the natural frequency of the crankshaft, as noted above. If, however, the TVD has a natural frequency in some other mode, such as bending in the axial direction, at a frequency that is lower than the natural frequency in torsion, then the TVD will undergo resonance in that mode each time the crankshaft rotates up to the RPM that matches the natural frequency in torsion. In general the axial spring rate of a TVD impacts the natural frequency for it. Thus, it is advantageous for a TVD to have a high spring rate in the axial direction, as is provided by selecting K1$b$ to be at least ten time as large as K1$a$. Furthermore, the value for K1$b$ can be controlled without affecting K1$a$, since the thickness w3 and the thickness t1 can be controlled independently from one another as needed to provide values for K1$a$ and K1$b$ that are desired. By contrast, the rubber layer 16 in the TVD 10 is difficult to design. If the layer is modified to be thicker or thinner so as to increase the natural frequency in bending in the axial direction, this will also simultaneously affect the natural frequency in torsion and will also impact its mechanical strength.

FIGS. 8A-8D are finite element representations that show the first four modes for the TVD 10, while FIGS. 9A-9D show the first four modes for the TVD 26. As can be seen, the first mode for the TVD 10 is not torsion—it is bending in the axial direction, which occurs (in two axes) at about 307 Hz (FIG. 8A) and 323 Hz (FIG. 8B) respectively. The torsional mode only occurs at 335 Hz. Finally, the mode relating to pure axial deformation occurs at 383 Hz. By contrast, for the TVD 26, the first mode is in torsion, which occurs at 335 Hz. The second and third modes are for bending in the axial direction, which occur at 622 Hz, while the mode relating to pure axial deformation occurs at 945 Hz.

Figure 12:
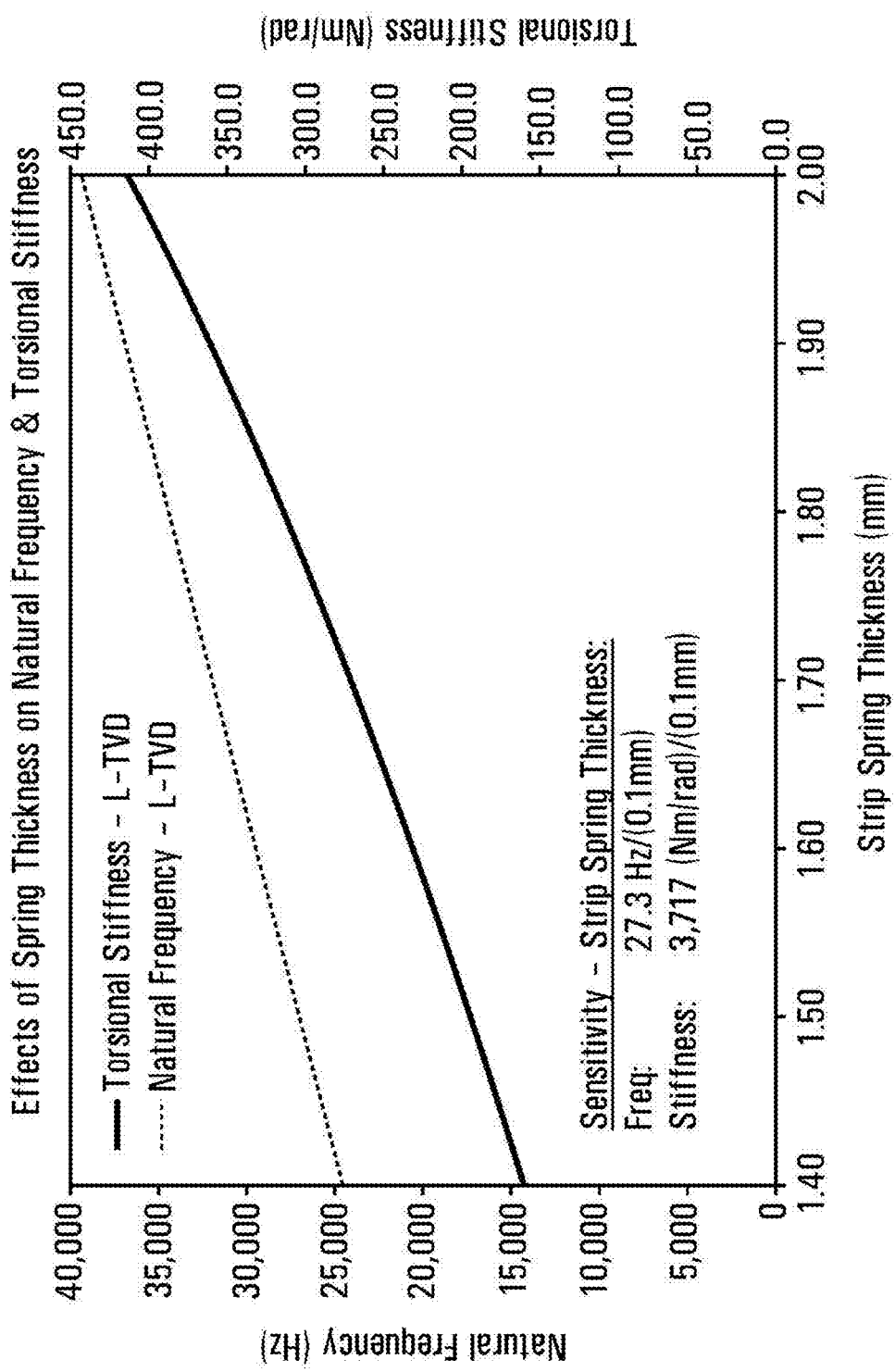
FIG. 12 is a graph illustrating spring thickness vs. natural frequency and spring rate for the TVD shown in FIG. 4A.

FIG. 12 is a graph illustrating spring thickness vs. natural frequency and spring rate for the TVD 26. As can be seen the spring thickness t1 directly affects the natural frequency and the spring rate K1$a$.

Figure 13:
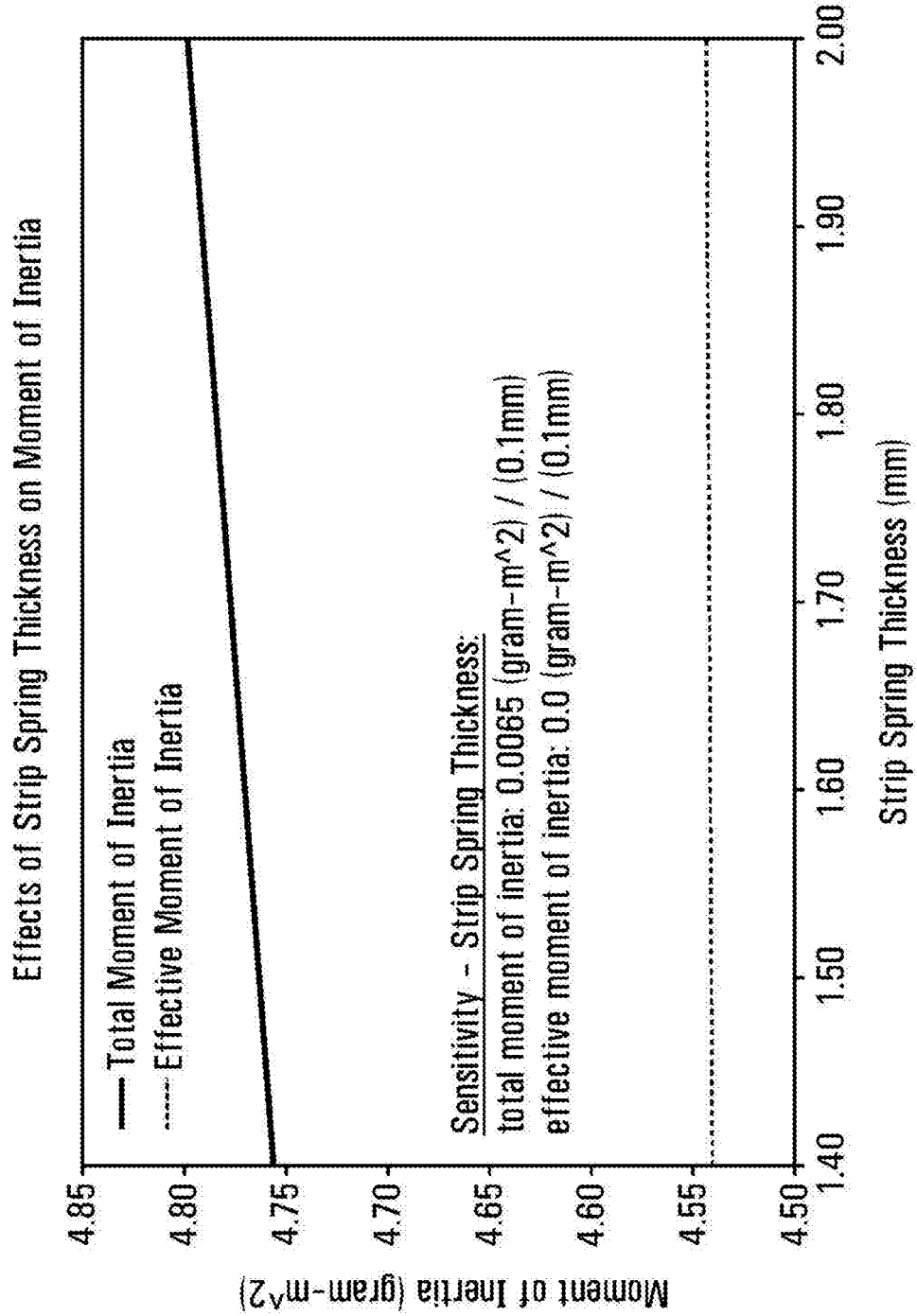
FIG. 13 is a graph illustrating spring thickness vs. the moment of inertia for the TVD shown in FIG. 4A.

FIG. 13 is a graph illustrating spring thickness vs. the moment of inertia for the TVD 26. As can be seen the spring thickness t1 has essentially no effect on the moment of inertia.

In another embodiment, a method of constructing a torsional vibration damper is provided, comprising:

a) providing a hub portion (e.g. the hub portion 30) which is devoid of springs, is mountable to a crankshaft (e.g. the crankshaft 22), and defines an axis (the axis A);

b) providing an outer ring (e.g. the outer ring 34) that includes an inertial mass (e.g. inertial mass 36) and which is devoid of springs;

c) providing a spring arrangement that includes a plurality of radial connectors (e.g. radial connectors 38) that extend radially between the hub portion and the outer ring, wherein the spring arrangement is elastically deformable with a circumferential spring rate K1$a$ in relation to bending in a circumferential direction, and wherein the spring arrangement has an axial spring rate K1$b$ in relation to bending movement in an axial direction;

and wherein the first circumferential spring rate is smaller than the first axial spring rate;

d) providing a damping arrangement (e.g. spacers 44) that dampens flexure of the spring arrangement;

e) determining a target natural frequency for the torsional vibration damper in relation to bending in the circumferential direction, based at least in part on a natural frequency of the crankshaft;

f) selecting a value for at least one of t1, w3, N1, D3 and D4 such that a lowest natural frequency for the torsional vibration damper is for bending in the circumferential direction about the axis, wherein:

t1=a thickness in a circumferential direction of each of the plurality of first radial connectors w3=a thickness in an axial direction of each of the plurality of first radial connectors, N1=the number of first radial connectors making up the plurality of first radial connectors, D3=a diameter from the axis to a second end of a free portion of the plurality of first radial connectors, and D4=a diameter from the axis to a first end of the free portion of the plurality of first radial connectors.

Persons skilled in the art will appreciate that there are yet more alternative implementations and modifications possible, and that the above examples are only illustrations of one or more implementations. The scope, therefore, is only to be limited by the claims appended hereto and any amendments made thereto.

The invention claimed is:

1. A torsional vibration damper, comprising:
 a hub portion that is mountable to a crankshaft of an engine and which defines an axis, wherein the hub portion is devoid of springs;
 an outer ring that includes an inertial mass and which is devoid of springs;
 a plurality of radial connectors that extend between the outer ring and the hub portion and connect the outer ring and the hub portion, wherein the radial connectors are elastically deformable to permit relative circumferential movement about the axis between the outer ring and the hub portion and which urge the outer ring and the hub portion back towards a neutral position there during, wherein the radial connectors extend directly between the hub portion and the outer ring; and a plurality of spacers that extend circumferentially between the radial connectors and which are elastically deformable by the radial connectors during flexure thereof, during said relative circumferential movement about the axis between the outer ring and the hub portion and which urge the outer ring and the hub portion towards the neutral position during said relative circumferential movement, wherein the spacers are non-metallic and dissipate energy from deformation via conversion to heat, wherein the plurality of radial connectors have a circumferential spring rate K1$a$ in bending in a circumferential direction about the axis, and have an axial spring rate K1$b$ in bending in an axial direction, wherein K1$b$ is at least 10 times as large as K1$a$, wherein the plurality of spacers have a circumferential spring rate Kra in the circumferential direction, and an axial spring rate Krb in bending in the axial direction, wherein Kra is less than 1% of K1$a$.

2. A torsional vibration damper as claimed in claim 1, wherein the spacers are made from rubber.

3. A torsional vibration damper as claimed in claim 1, wherein the radial connectors are made from spring steel.

4. A torsional vibration damper as claimed in claim 1, wherein the radial connectors extend directly radially between the outer ring and the hub portion when the outer ring and the hub portion are in the neutral position.

5. A torsional vibration damper as claimed in claim 1, wherein the radial connectors include a plurality of first connectors that have a first bending resistance during said relative circumferential movement about the axis between the outer ring and the hub portion, and a plurality of second connectors that have a second bending resistance during said relative circumferential movement about the axis between the outer ring and the hub portion.

6. A torsional vibration damper as claimed in claim 1, wherein the outer ring is made from cast steel.

7. A torsional vibration damper as claimed in claim 1, wherein the outer ring includes a plurality of outer ring slots and the hub portion includes a plurality of hub portion slots and the radial connectors extend into the outer ring slots and into the hub portion slots.

8. A torsional vibration damper as claimed in claim 1, wherein the natural frequency in relation to torsion for the torsional vibration damper is between 250 Hz and 550 Hz.

9. A torsional vibration damper as claimed in claim 1, wherein:

m=a mass of the inertial mass, t1=a thickness in a circumferential direction of each of the plurality of radial connectors, w3=a thickness in an axial direction of each of the plurality of radial connectors, N1=a number of radial connectors making up the plurality of radial connectors, D3=a diameter from the axis to a second end of a free portion of the plurality of radial connectors, and D4=a diameter from the axis to a first end of the free portion of the plurality of radial connectors, wherein m, t1, w3, N1, D3 and D4 are selected such that a natural frequency for the torsional vibration damper for bending in the circumferential direction about the axis is lower than a natural frequency for the torsional vibration damper for bending in the circumferential direction about the axis.

10. A torsional vibration damper, comprising:

a hub portion that is mountable to a crankshaft of an engine and which defines an axis, wherein the hub portion is devoid of springs;

an outer ring that includes an inertial mass and which is devoid of springs;

a plurality of radial connectors that extend between the outer ring and the hub portion and connect the outer ring and the hub portion, wherein the radial connectors are elastically deformable to permit relative circumferential movement about the axis between the outer ring and the hub portion and which urge the outer ring and the hub portion back towards a neutral position there during, wherein the radial connectors extend directly between the hub portion and the outer ring and are metallic; and a plurality of spacers that extend circumferentially between the radial connectors and which are elastically deformable by the radial connectors during flexure thereof, during said relative circumferential movement about the axis between the outer ring and the hub portion and which urge the outer ring and the hub portion towards the neutral position during said relative circumferential movement, wherein the spacers are non metallic and dissipate energy from deformation via conversion to heat, wherein the plurality of spacers have a circumferential spring rate Kra in relation to bending in a circumferential direction, and an axial spring rate in bending in the axial direction, wherein Kra is less than 1% of K1$a$, wherein:

m=a mass of the inertial mass, t1=a thickness in a circumferential direction of each of the plurality of radial connectors, w3=a thickness in an axial direction of each of the plurality of radial connectors, N1=a number of radial connectors making up the plurality of radial connectors, D3=a diameter from the axis to a second end of a free portion of the plurality of radial connectors, and D4=a diameter from the axis to a first end of the free portion of the plurality of radial connectors, wherein m, t1, w3, N1, D3 and D4 are selected such that a natural frequency for the torsional vibration damper for bending in the circumferential direction about the axis is lower than a natural frequency for the torsional vibration damper for bending in the circumferential direction about the axis.

11. A method of constructing a torsional vibration damper, comprising:

a) providing a hub portion that is devoid of springs, is mountable to a crankshaft, and defines an axis;

b) providing an outer ring that includes an inertial mass and which is devoid of springs;

c) providing a spring arrangement that includes a plurality of radial connectors that extend radially between the hub and the outer ring, wherein the spring arrangement is elastically deformable with a circumferential spring rate K1$a$ in relation to bending in a circumferential direction, and wherein the spring arrangement has an axial spring rate K1$b$ in relation to bending movement in an axial direction;

and wherein the first circumferential spring rate is smaller than the first axial spring rate;

d) providing a damping arrangement that dampens flexure of the spring arrangement;
e) determining a target natural frequency for the torsional vibration damper in relation to bending in the circumferential direction, based at least in part on a natural frequency of the crankshaft;
f) selecting a value for at least one of t1, w3, N1, D3 and D4 such that a natural frequency for the torsional vibration damper for bending in the circumferential direction about the axis is lower than a natural frequency for the torsional vibration damper for bending in the circumferential direction about the axis, wherein:

t1=a thickness in a circumferential direction of each of the plurality of first radial connectors w3=a thickness in an axial direction of each of the plurality of first radial connectors, N1=the number of first radial connectors making up the plurality of first radial connectors, D3=a diameter from the axis to a second end of a free portion of the plurality of first radial connectors, and D4=a diameter from the axis to a first end of the free portion of the plurality of first radial connectors.

12. A method as claimed in claim 11, wherein the plurality of radial connectors have a circumferential spring rate K1*a* in bending in a circumferential direction about the axis, and have an axial spring rate K1*b* in bending in an axial direction, wherein K1*b* is at least 10 times as large as K1*a*.

\* \* \* \* \*